June 21, 1927.  A. G. LORENZ  1,633,414
COMBINED LICENSE PLATE AND IDENTIFICATION CARD HOLDER
Filed March 14, 1927
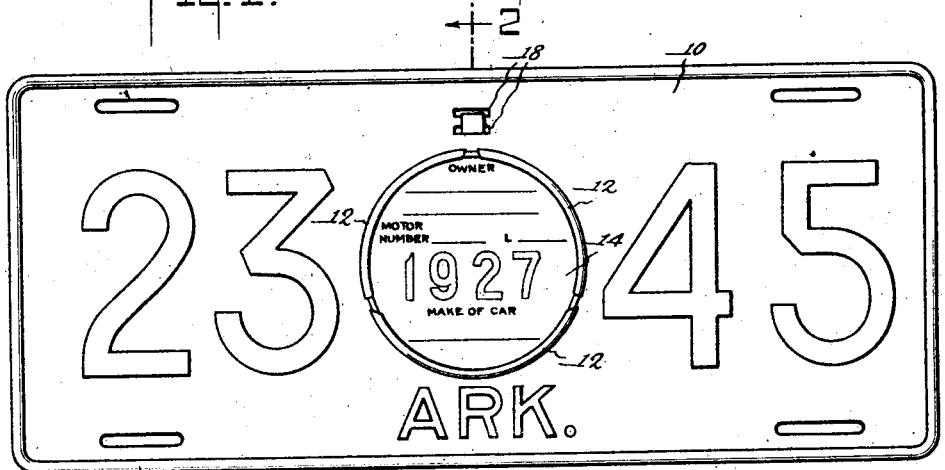
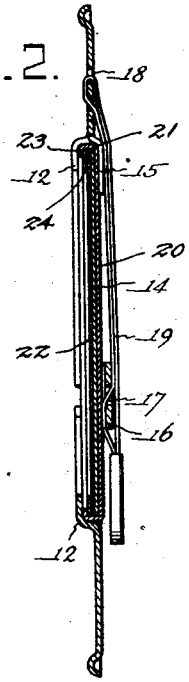
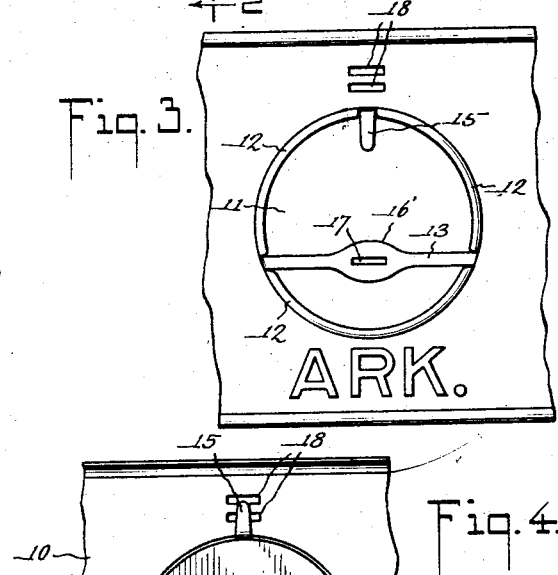
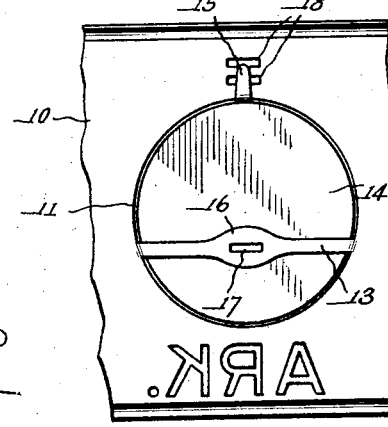
WITNESSES
INVENTOR
A. G. LORENZ
BY
ATTORNEY Patented June 21, 1927.

1,633,414

UNITED STATES PATENT OFFICE.

ADOLPH G. LORENZ, OF LITTLE ROCK, ARKANSAS.

COMBINED LICENSE-PLATE AND IDENTIFICATION-CARD HOLDER.

Application filed March 14, 1927. Serial No. 175,277.

This invention relates to license plates for vehicles and refers more particularly to a license plate provided with means for attaching, supporting and displaying an identification member having indicia thereon relative to the name of the owner of the vehicle, the license number thereof, the make of the car, the year, date, etc.

One of the principal objects of the present invention is to provide in conjunction with a vehicle license plate, identification means which will serve to prevent the switching of license plates from one vehicle to another, a common practice which is resorted to when vehicles are stolen and which necessarily baffles and impedes the authorities in tracing a stolen vehicle.

The invention furthermore aims to provide a combined license plate and identification member including means for sealing the identification member to the license plate in such a manner as to prevent its removal or substitution without detection.

Other objects reside in the simplicity of construction, the economy with which the same may be produced, and the general efficiency derived therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a face view of a license plate equipped with an identification member and means for associating the same with said plate;

Fig. 2 is a vertical sectional view therethrough taken approximately on the line 2—2 of Fig. 1;

Fig. 3 is a fragmentary front view with the identification member removed;

Fig. 4 is a fragmentary rear view of the license plate with the identification member in place and prior to the sealing of the same.

Referring to the drawings by characters of reference, 10 designates the license plate or tag, which may be of the usual embossed type constructed from sheet metal. At a suitable point on the plate or tag, an aperture 11 is formed provided with marginal circumferentially spaced bead sections 12, which are bent forwardly and inwardly to define a seat transversely, and the aperture 11 between its center and lower edge, has a strap 13 which is offset slightly rearwardly and which combines with the bead sections 12 to admit of the positioning therein of the identification member 14. At the upper end of the aperture 11, a bendable tongue 15 is formed which is inwardly bent upwardly to the position illustrated in Fig. 4, to allow for the insertion of the identification member 14, after which the tongue is bendable downwardly to the positions illustrated in Figs. 2 and 3, to retain the identification member 14 in place. The strap 13 is medially enlarged at 16 and is formed with a slot 17 while the license plate 10 above the aperture is provided with a pair of horizontal parallel slots 18. In order to seal the identification member 14 within the aperture, any suitable form of sealing device 19 is employed which is engaged through the pair of slots 18 in the plate body and through the slot 17 in the strap 13, as illustrated in Fig. 2.

The identification member 14 preferably consists of a card of the desired configuration which is enclosed in a casing 20 having a marginal wall 21, a suitable transparent water-proof panel 22 being arranged over the face of the card, after which the marginal flange is bent inwardly to provide a bead 23, between which bead and the panel 22 a gasket or washer 23 is disposed. This renders the identification card or member 14 impervious to water in addition to excluding dust or dirt from entering the casing and obscuring the indicia on the card.

From the foregoing it will thus be seen that the shifting of license plates may be more readily detected, due to the fact that the identification device which is adapted to bear indicia relating to the name of the owner, the motor number, and make of the vehicle, when once associated with and sealed to the license tag, cannot be removed therefrom without detection.

What is claimed is:

1. In a vehicle license plate, an apertured portion having marginal forwardly offset circumferentially spaced bead sections and a rearwardly offset strap transverse of the apertured portion, disposed at one side of the diametrical center of the apertured portion, said strap having a medial slot and the said plate having a pair of parallel slots for the reception of a sealing device coacting with the strap to seal the identification device in the apertured portion.

2. A license plate for motor vehicles having an aperture formed with flange sections and a transverse strap arranged at one side of the diametrical center of the aperture to constitute a seat for the reception of an identification member, and means provided respectively on the strap and in the plate on the opposite side of the aperture for receiving a sealing device which combines with the strap to prevent disassociation of the identification device and the license plate.

ADOLPH G. LORENZ.